United States Patent [19]
Souliac et al.

[11] Patent Number: 6,090,501
[45] Date of Patent: Jul. 18, 2000

[54] SAFETY DEVICE FOR AN ELECTROCHEMICAL STORAGE CELL

[75] Inventors: Laurent Souliac, Saint Benoit; Gérard Rigobert, Poitiers, both of France

[73] Assignee: Alcatel, Paris, France

[21] Appl. No.: 09/172,868

[22] Filed: Oct. 15, 1998

[30] Foreign Application Priority Data

Oct. 16, 1997 [FR] France .................................. 97 12959

[51] Int. Cl.$^7$ .................................................. H01M 2/20
[52] U.S. Cl. .................................................. 429/61; 429/7
[58] Field of Search .................... 429/53, 61, 7

[56] References Cited

U.S. PATENT DOCUMENTS

| | | |
|---|---|---|
| 3,264,438 | 8/1966 | Gay . |
| 3,625,767 | 12/1971 | Clark .......................................... 136/83 |
| 3,793,501 | 2/1974 | Stonestrom . |
| 5,382,479 | 1/1995 | Schuster .................................. 429/112 |
| 5,523,178 | 6/1996 | Murakami ................................. 429/53 |
| 5,770,329 | 6/1998 | Harney ..................................... 429/112 |

FOREIGN PATENT DOCUMENTS 0 665 568 A1  8/1995  European Pat. Off. .
WO 97/41582  11/1997  WIPO .

*Primary Examiner*—Maria Nuzzolillo
*Assistant Examiner*—Mark Ruthkosky
*Attorney, Agent, or Firm*—Sughrue, Mion, Zinn, Macpeak & Seas, PLLC

[57] ABSTRACT

A safety device for an electrochemical storage cell or a module of electrochemical cells, said safety device comprising at least one means for detecting anomalous operation of said storage cell or of a storage cell in said module, said detection means for detecting being associated with a pyrotechnic device, said pyrotechnic device being associated both with at least one means for shearing a portion of an electrical connection strip of said storage cell or of said module, and with at least one means for bypassing the portion which can be sheared.

12 Claims, 1 Drawing Sheet

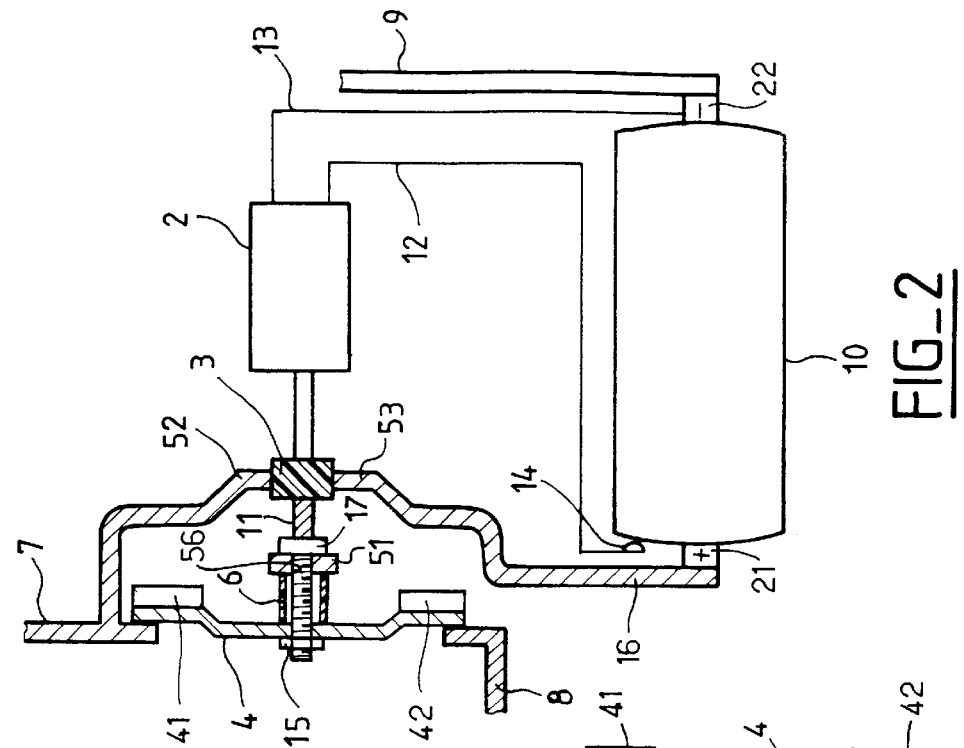
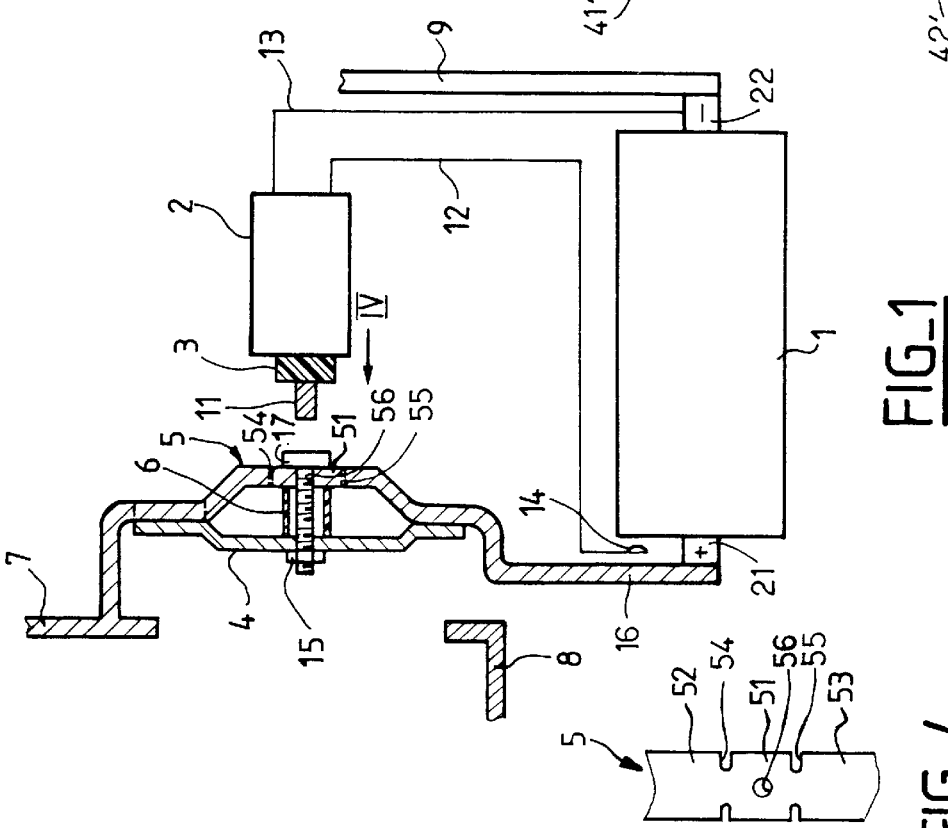

SAFETY DEVICE FOR AN ELECTROCHEMICAL STORAGE CELL

The present invention relates to a safety device for an electrochemical storage cell, in particular a device of the circuit-breaking type that operates in the event of high currents being delivered, i.e. about 40 A to 150 A.

BACKGROUND OF THE INVENTION

Existing circuit-breaker devices for electrochemical storage cells taken individually, or associated to form a module or battery of cells (an assembly comprising at least one module), and located outside said storage cell are generally designed to break a circuit when the current being delivered is of the order of a few amps, typically 1 A to 2 A. Such devices act in the event of an anomaly in the operation of said electrochemical storage cell, typically an increase in pressure and/or temperature, e.g. due to the storage cell being overcharged or overdischarged. However, when the delivered currents are significantly higher, such circuit breaker devices are no longer effective, in particular because of the larger section of wire that needs to be broken.

Also, circuit breaker devices used when high currents are delivered by electrochemical storage cells taken individually, or more generally when cells are associated in the form of a battery, are fuse type circuit breaker devices, and they suffer from the drawbacks of being relatively slow (a few seconds between an anomaly being detected and the circuit being broken), and above all of completely preventing any further flow of electricity, thereby putting the entire battery associated with said cell out of circuit, whenever the cell forms part of a battery.

Thus one of the problems which arises is that of finding a device suitable for breaking the circuit in the event of a given storage cell delivering an excessively high current, typically 40 amps to 150 amps, and that is capable of acting as a complete shunt, i.e. that is capable, in the event of the storage cell operating anomalously, of putting a bypass conductor in place in parallel with the disconnected cell for the purpose of carrying substantially all of the current that was previously passing through the cell. Another of the problems posed is that of finding a circuit breaker device that is reliable and relatively fast, without being dangerous for the user.

Finally, another problem which is posed is that of making a device that ensures good electrical contact for the electrical connections of a cell while it is in normal use prior to any operating anomaly. This problem is particularly critical when high currents are delivered. In particular, it is advantageous to have connections that are reliable and safe, where the electrical contacts do not increase electrical resistance and do not oxidize.

OBJECTS AND SUMMARY OF THE INVENTION

The present invention makes it possible to bypass and electrical connection strip for connecting the storage cell to its charge and/or discharge circuit, by using a pyrotechnic device. Putting said bypass into place shunts the cell completely in the event of anomalous operation. Also, for storage cells that are mounted in a module, such a device makes it possible to bypass an electrical connection strip of a module. When the module is included in a battery of at least two modules, the device of the invention thus allows the remainder of the battery to continue operating.

Thus, the present invention provides a safety device for an electrochemical storage cell, the device comprising at least one means for detecting anomalous operation of said storage cell, said means being associated with a pyrotechnic device, said pyrotechnic device being associated both with at least one means for shearing a portion of an electrical connection strip of said storage cell, and with at least one means for bypassing the portion that can be sheared.

By using a pyrotechnic device, the safety device of the invention has the advantage of enabling a storage cell to be taken out of circuit quickly, typically in a period of less than 50 ms and greater than 10 ms, and of enabling this to be done reliably.

Furthermore, in the event of normal operation prior to any anomaly in operation, the use of such a device has the advantage of providing electrical contacts that are reliable because the flow passes through a physical connection bar or through screws.

The invention also provides a safety device for a module of electrochemical storage cells, the device comprising at least one means for detecting anomalous operation of a storage cell included in said module, said means being associated with a pyrotechnic device, said pyrotechnic device being associated both with at least one means for shearing a portion of an electrical connection strip of said storage cell or said module, and with at least one means for bypassing the portion that can be sheared.

Preferably, every cell in said module has its own means for detecting an operating anomaly.

By using a pyrotechnic device, the safety device of the invention has the advantage of enabling a module of storage cells to be taken out of circuit quickly, typically in a period of less than 50 ms and greater than 10 ms, and of enabling this to be done reliably. In addition, in a first embodiment, it makes it possible to take a faulty cell in the module out of circuit without taking the entire module out of circuit. In a second embodiment, applied to a battery of at least two modules of storage cells, it also makes it possible to take out of circuit the module having the faulty cell without taking the remainder of the battery out of circuit.

BRIEF DESCRIPTION OF THE DRAWING

The invention will be better understood and other advantages and features will appear on reading the following description given in non-limiting manner and with reference to the accompanying drawing.

FIG. 1 is a fragmentary section view of a storage cell and a safety device of the invention before said safety device has triggered.

FIG. 2 is a section view of the same cell and safety device after said safety device has triggered.

FIG. 3 is a perspective view of the part 4 on its own.

FIG. 4 is a side view of the part 5 on its own as seen looking along arrow IV (see FIG. 1).

The same reference numerals are used to designate the same elements in the various figures.

MORE DETAILED DESCRIPTION

FIG. 1 shows a storage cell 1 fitted with a safety device of the invention. The storage cell has a positive terminal 21 connected to a strip 7 by a strip 16 and then via a strip 5 in parallel with the strip 4, and a negative terminal 22 connected to a strip 9. The strips 16, 4, 5, 7, and 9 belong to a circuit for charging and/or discharging the cell 1.

FIG. 4 is a side view seen looking along arrow IV (cf. FIG. 1) showing the strip 5 before the safety device has triggered. It comprises a central portion 51 suitable for being sheared, and located between a portion 52 and a portion 53. In order to facilitate shearing, the portion 51 of the fixed strip 5 is defined by two zones of weakness 54 and 55. The breakage area of said portion 51 generally lies in the range 10 mm$^2$ to 70 mm$^2$ for a storage cell of capacity lying in the range 50 Ah to 100 Ah.

The connection strip 5 has a central opening 56 enabling the moving electrical connection strip 4 to be secured by means of a screw 17. The zone 51 is prestressed by at least one prestress means (6, 15, 17) so as to facilitate shearing. The prestress means shown in FIG. 1 comprise a spacer 6 secured to the strips 4 and 5 by tightening the screw 17 in a nut 15.

FIG. 3 is a perspective view of the moving strip 4. It has four lugs 41, 41', 42, 42' enabling the strip 4 to be held on the strip 5 and preventing said strip 4 from moving in rotation.

The current which flows through the positive outlet terminal 21 flows through the strip 16, and is then shared between the moving strip 4 and the stationary strip 5 before reaching the strip 7. The current which flows through the negative outlet terminal 22 flows through the strip 9. The strip 8 does not carry current. It is provided to enable the moving strip 4 to constitute a bypass. As a result, current flows between the strip 9 and the strip 7 via the storage cell 1.

The safety device of the invention comprises means (12, 13, 14) for detecting an operating anomaly, which means are associated with a pyrotechnic device 2 that is itself associated both with shear means 11 and with means (4, 7, 8) for setting up a bypass.

The pyrotechnic device 2 is connected by an electric wire 13 to the negative terminal 22 of the cell and by a wire 12 to a swelling contact feeler 14 which does not come into contact with said cell before the safety device has triggered. The case of the cell is at the positive polarity. The pyrotechnic device 2 includes shear means constituted by a piston 11. The pyrotechnic device is suitable for being triggered by an electrical initiator which, at a certain voltage and from a certain amperage causes powder contained in said pyrotechnic device 2 to ignite, thereby increasing in volume by giving off gas which generates sufficient pressure to drive the piston 11. By way of example, the pyrotechnic device may have the following characteristics: (1A; 2.5 V). The piston 11 is associated with a plastics wedge 3. The plastics wedge 3 is an insulating part suitable for occupying at least a portion of the space previously occupied by the central portion 51 of the strip 5.

FIG. 2 shows the elements of FIG. 1 after the safety device has been triggered. The device has operated because the pyrotechnic device 2 has been put into an electrical circuit due to the feeler 14 coming into contact with the swollen cell 10, thereby causing the piston 11 to be driven out of the pyrotechnic device and in turn, to break the central proton 51 of the strip 5 by shearing it. Thereafter the piston establishes a bypass circuit by putting the moving strip 4 into contact with the strip 8. The device of the invention may also include guide means (not shown) for guiding the portion 51 of the strip 5 that is sheared when the bypass is established. The wedge 3 takes up a position between the remaining portions 52 and 53 of the fixed strip 5, thereby guaranteeing electrical insulation and thus making the electrical bypass effective. Current then flows through the bypass strip 8 and the strip 7 via the moving strip 4 and thus avoids the misfunctioning storage cell 10.

The device of the invention may also have at least one device for discharging the accumulator or the module that it serves to bypass (not shown herein).

An embodiment other than shown in FIGS. 1 to 4 includes means for detecting anomalous operation constituted by temperature detection means, e.g. a temperature probe received in the vicinity of the storage cell or the module of storage cells, in a manner known to the person skilled in the art.

In an embodiment of the invention, the portion liable to be sheared off is defined by one or at least two zones of weakness, or by any other weakness-provoking configuration.

The safety device of the invention is particularly adapted to use in a battery for an electric vehicle. The invention relates to a battery having at least one module of electrochemical storage cells including at least one safety device of the invention. Typically, a battery for an electric vehicle may have thirty modules connected in series, each module being in the form of a one-piece case having six slots each containing one storage cell, the six cells operating in a configuration of three in series by two in parallel or of two in series by three in parallel. At least one, but preferably all, of the cells in the module of such a battery includes a safety device of the invention. Finally, the invention also relates to a vehicle having at least one propulsion means powered from an energy source including at least one such battery. The invention thus applies in particular to using the above-described battery as a battery of an electric vehicle.

What is claimed is:

1. A safety device for an electrochemical storage cell, the device comprising at least one means for detecting anomalous operation of said storage cell, said means being coupled with a pyrotechnic device, said pyrotechnic device being opertionally coupled both with at least one means for shearing a portion of an electrical connection strip of said storage cell, and with at least one means for bypassing the portion that can be sheared.

2. A safety device for a module of electrochemical storage cells, the device comprising at least one means for detecting anomalous operation of a storage cell included in said module, said means being coupled with a pyrotechnic device, said pyrotechnic device being opertionally coupled both with at least one means for shearing a portion of an electrical connection strip of said storage cell or said module, and with at least one means for bypassing the portion that can be sheared.

3. A device according to claim 2, such that every storage cell included in said module includes its own means for detecting anomalous operation.

4. A device according to claim 1, such that said device also includes an insulating piece suitable for being inserted at least in part to take the place of the portion suitable for being sheared.

5. A device according to claim 1, such that the portion of the strip that is suitable for being sheared is prestressed by at least one prestress means.

6. A device according to claim 1, such that the portion of the strip that is suitable for being sheared is defined by at least one zone of weakness.

7. A device according to claim 1, further comprising at least one device for discharging the storage cell or the module that may be bypassed.

8. A device according to claim 1, further comprising means for guiding the portion of the strip that is suitable for being sheared while the bypass is being established.

9. A device according to claim 1, such that the means for detecting anomalous operation is means for detecting swelling of the storage cell coupled with means for making electrical connection to the pyrotechnic device.

10. A device according to claim 1, such that the means for detecting anomalous operation is means for detecting the temperature of the storage cell coupled with means for making electrical connection to the pyrotechnic device.

11. A battery including at least one module of electrochemical storage cells having at least one safety device according to claim 1.

12. A vehicle including at least one propulsion means and powered from at least one energy source including at least one battery according to claim 11.

* * * * *